N. F. POTTER.
Peat Machine.
No. 54,402.
Patented May 1, 1866.
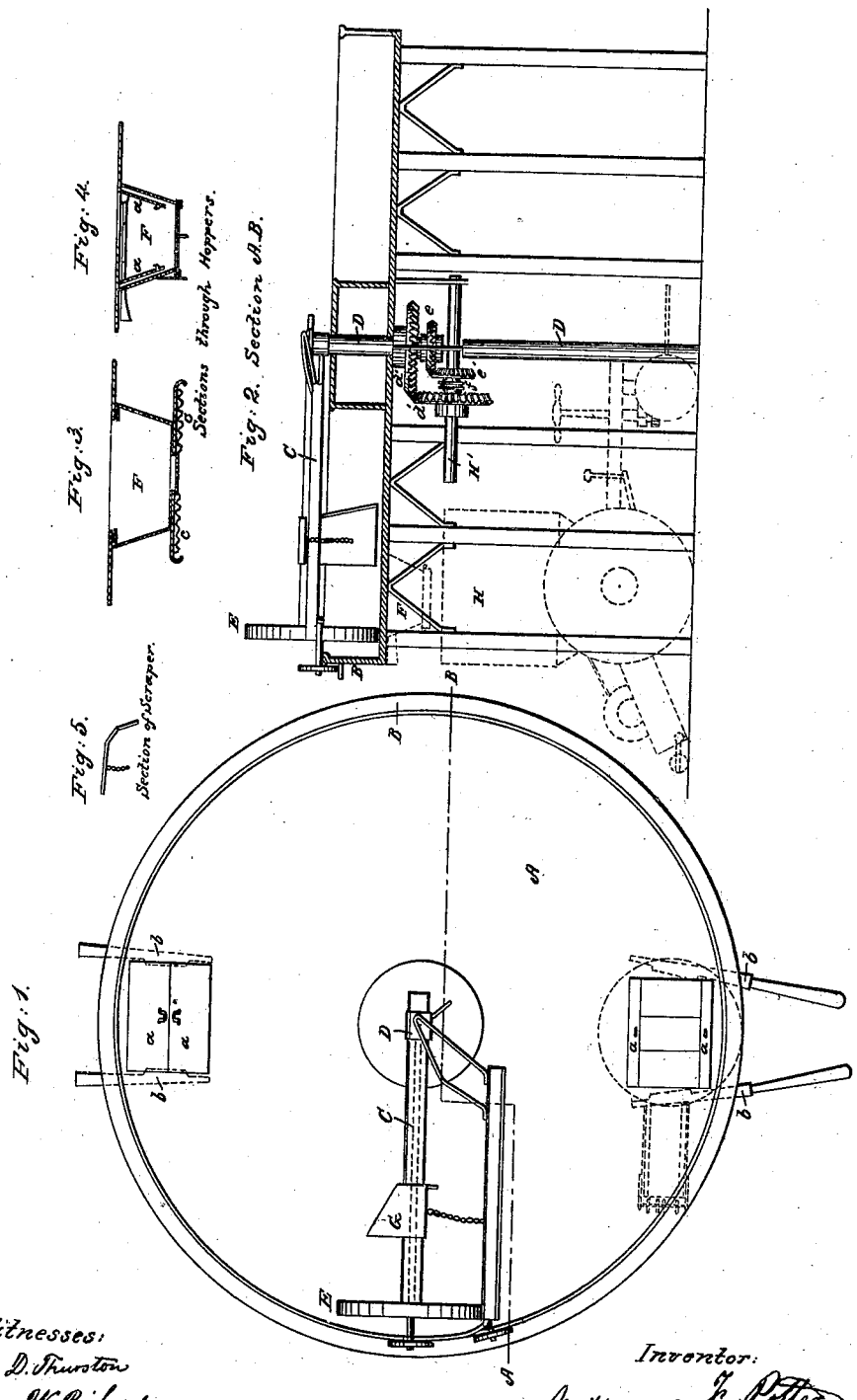

UNITED STATES PATENT OFFICE.

NATHANIEL F. POTTER, OF PROVIDENCE, RHODE ISLAND.

IMPROVED PEAT-MACHINE.

Specification forming part of Letters Patent No. 54,402, dated May 1, 1866.

*To all whom it may concern:*

Be it known that I, NATHANIEL F. POTTER, of the city and county of Providence, in the State of Rhode Island, have invented certain new and useful Improvements in Machines for Manufacturing Peat for Fuel; and I do hereby declare that the following specification, taken in connection with the drawings making a part of the same, is a full, clear, and exact description thereof.

Figure 1 is a top view. Fig. 2 is a section on the line A B. Figs. 3 and 4 are sections through the hoppers. Fig. 5 is a section of the scraper.

The invention herein described relates to that class of machines for tempering clay and similar plastic material, for improvements in which, adapting the same to the preparation of peat for fuel, Letters Patent of the United States have been heretofore granted to me bearing date April 18, 1865.

The present improvement is principally designed to facilitate the removal of the peat from the machine after it has been tempered and the delivery of it to the apparatus—as, for instance, that described in the Letters Patent granted to me May 2, 1865, for pressing and molding it into blocks of convenient form for use.

In the accompanying drawings, A, Fig. 1, represents the machine for tempering clay for bricks patented to Nathaniel Adams, December 16, 1833, which consists of a circular bed, A, surrounded by a rim, B. C is a sweep radiating from a central upright shaft, D, Fig. 2, and of sufficient height above the plane of the surface of the bed A to accommodate the tempering-wheel E, which turns upon the sweep as an axle. By a familiar arrangement, shown in the patent of Adams referred to, this tempering-wheel, as the sweep is turned, is made to gradually approach the central shaft, D, and then as gradually, by the shifting of the gearing, return toward the rim of the mill, and thus during its spiral path of travel cut up and render homogeneous, or "temper," as it is termed, the mass of clay upon which it acts.

I adapt this machine for the purpose of performing the same operation upon peat, and use it for the purpose of tempering the mass in all respects as in the instance of working clay preparatory to molding the same into bricks; and I also make use of the several improvements which I have added to this machine for removing the undecomposed vegetable fiber which pervades the mass, and which are the subjects of the patent granted to me April 18, 1865, before referred to, but which are not shown in the drawings.

In order that the present improvement may be understood, it should be supposed that the mass of peat within the mill has been tempered and cleaned of fiber by the means above described, and that it is desired to remove the same to the apparatus which is to press and mold it.

Underneath the bed A of the mill are placed two pockets or hoppers, F, on opposite sides, Figs. 2, 3, and 4, which are cut off from the mill while the tempering process is going on by hinged trap-doors *a a*, closed and securely barred, as shown at *b b*, Fig. 1, so that the floor shall be continuous, but which can be readily allowed to open by swinging downward, as shown at Fig. 4. The mouths of the pockets are furnished with sliding doors *c c*, Fig. 3, to regulate the delivery of the peat.

Upon the sweep C is placed a scraper, G, which is removable at pleasure, and is only used when the mill is to be emptied. It is placed directly behind the tempering-wheel E, and is arranged to travel along the sweep from the center toward the circumference of the bed by the same gearing which works the tempering-wheel. It is obvious that, as its scraping-edge is made to stand at an angle with the axis of the sweep, the whole mass of peat will be gradually forced toward the outer edge of the circle of the bed and be delivered into the pockets, from which it can be received by the molding and spreading machine shown at H, Fig. 2, the mill being elevated sufficiently to admit of this arrangement.

I also arrange the upright shaft D, from which the sweep C radiates, so that it can be revolved at two different rates of speed, according to the degree of resistance to be overcome, by means of the double set of toothed wheels *d d'* and *e e'*, *d* and *e* being each keyed to their respective shafts, while *d'* and *e'* are loose, but can respectively be made fast by means of the clutch *f*, which slides upon a feather, and is capable of being worked so as to connect with the one wheel or the other or be disconnected from both by means of a lever, in a way well understood, from which it is obvious that an increased or a reduced speed can be given to the shaft D relatively to the speed of the driving-shaft H' in the ratio of the diameters of the wheels to be driven to the diameters of their drivers, respectively. This is an arrangement practically of much importance, for the reason that the path of the tempering-wheel is constantly lengthening as the wheel approaches the outer edge of the bed A, and unless the speed of the shaft D is reduced the work will be imperfectly done.

What I claim as my invention, and desire to secure by Letters Patent, is—

1. The use of one or more receiving and delivering pockets, F, in combination with a tempering-mill, substantially as described, for the purposes specified.

2. Combining with a mill for tempering peat or other material a scraper, G, operating in the manner described, for the purposes specified.

3. The double set of driving-gears $d\ d'\ e\ e'$ and the clutch $f$, when the same are combined with the sweep of a tempering-mill, substantially as described.

NATHANIEL F. POTTER.

Witnesses:
JOHN D. THURSTON,
WILLIAM W. RICKARD.